Jan. 18, 1972   W. J. ASHER   3,636,118
SELECTIVE ADSORPTION PROCESS USING A
PRESSURE OSCILLATION SYSTEM
Filed Aug. 25, 1969   3 Sheets-Sheet 1
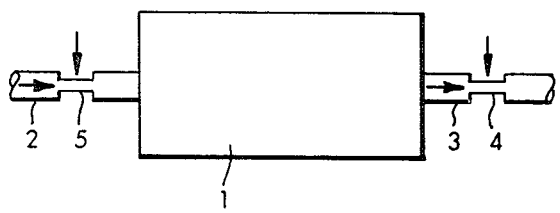
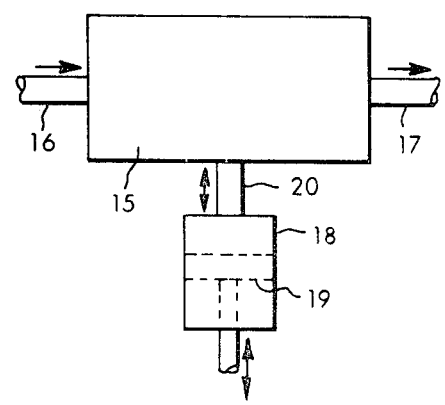
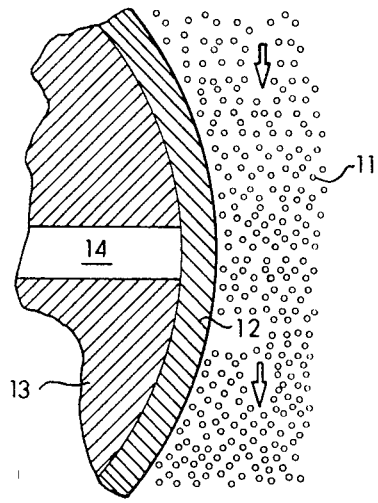
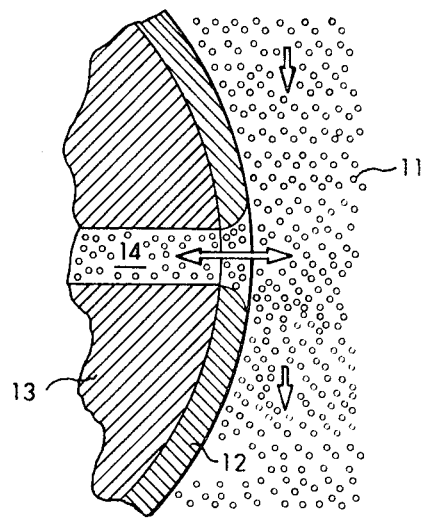
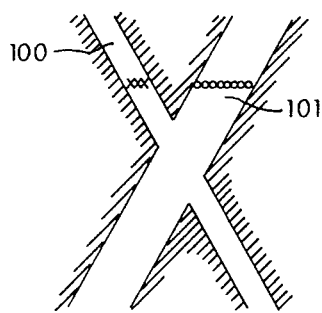
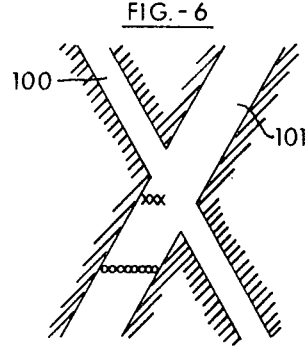
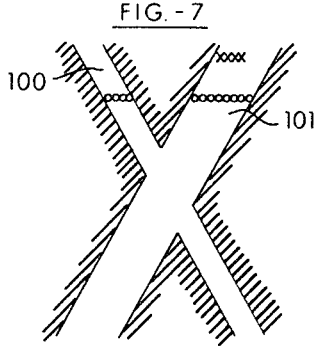
WILLIAM J. ASHER   Inventor
By
Attorney MORE COMPLETE REMOVAL OF n-PARAFFINS
ACHIEVED USING INTERNAL OSCILLATION WILLIAM J. ASHER   Inventor

INTERNAL OSCILLATION IN
DESORPTION REDUCES NH₃ REQUIREMENT

WILLIAM J. ASHER, Inventor
By [signature]
Attorney

United States Patent Office 3,636,118
Patented Jan. 18, 1972

3,636,118
SELECTIVE ABSORPTION PROCESS USING A
PRESSURE OSCILLATION SYSTEM
William J. Asher, Fanwood, N.J., assignor to Esso
Research and Engineering Company, Linden, N.J.
Continuation-in-part of application Ser. No. 703,143,
Feb. 5, 1968, which is a continuation-in-part of
application Ser. No. 363,258, Apr. 28, 1964. This
application Aug. 25, 1969, Ser. No. 866,053
Int. Cl. C07c 7/12; C10g 25/04; B01j 1/22
U.S. Cl. 260—674 SA                        18 Claims

ABSTRACT OF THE DISCLOSURE

A method of improving the mass transfer rate in gas-solid sorption and sorption-catalytic processes. The improvement is accomplished by rapidly oscillating the gas pressure on the bed. The improvement is most effective in processes which are limited by the rate of diffusion of the gaseous component into the pores of the solid material. A significant improvement is realized in processes wherein long-chain n-paraffins are separated from hydrocarbon mixtures.

CROSS-REFERENCES TO RELATED APPLICATIONS

This application is a continuation-in-part of copending application, Ser. No. 703,143, filed Feb. 5, 1968, now abandoned which application is a continuation-in-part of application, Ser. No. 363,258, filed Apr. 28, 1964, now abandoned.

BACKGROUND OF THE INVENTION

Field of the invention

This invention relates to a method for improving the efficiency of mass transfer limited processes. More particularly, this invention relates to a method for improving the efficiency of mass transfer limited processes wherein the molecules of at least one gaseous component penetrate the pores of a porous material. Still more particularly, this invention relates to a method for improving the efficiency of such processes which are mass transfer limited by the rate of diffusion of the gaseous component into the pores of the porous material.

Description of the prior art

It is known in the prior art that many sorption and catalytic processes wherein the molecules of at least one gaseous component penetrate the pores of a porous material are mass transfer limited. Several methods have been proposed to offset the limiting problem, however, none have been completely successful. For example, it is known that increasing the temperature will increase the mass transfer rate. This approach is practically limited by the maximum temperature which can be withstood by the system. It is also limited by the fact that the sorption capacity is decreased and undesirable side reactions are enhanced by the increased temperature.

Decreasing the particle size of the porous material is another method used to improve mass transfer. This method is practically limited by the smallest particle size which can be retained in the process. It also results in an undesirable increase in the pressure drop across the bed, thus increasing the cost of operation.

It is also known in the art to subject liquid-solid systems which are mass transfer limited to sonic vibration in an effort to improve the overall mass transfer. For example, in U.S. Pat. No. 3,121,757, there is disclosed a hydrocarbon separation process wherein both the hydrocarbon feed and molecular sieve sorbent are subjected to sonic vibration. The sonic vibration, when applied at a frequency of at least 10 kilocycles per second, results in an increased rate of sorption and an increased sorption capacity. This result is said to be due to the more direct alignment of the sorbable component with the pores of the sorbent and to greater access of the pores to the sorbable component. As a practical matter, the use of sonic vibration is ineffective in a gas-solid system.

BRIEF SUMMARY

It has now been found that the foregoing and other disadvantages can be avoided by the method of the present invention. Accordingly, it is an object of this invention to provide a gas-solid sorption or sorption-catalytic process having an improved mass transfer rate and increased sorption capacity. It is also an object of this invention to provide a gas-solid sorption process which is not limited by the rate of diffusion of the gas within the pores of the solid material. Another object of this invention is to provide a gas-solid sorption process which can be operated at lower temperatures and without an excessive pressure drop across the solids bed.

In accordance with this invention, these and other objects are accomplished by rapidly oscillating the gas pressure over the solids bed. The rapid oscillation of the gas pressure over the bed gives rise to a gross flow of gaseous material into and out of the pores of the solid material. As the pressure increases during the oscillation, the gaseous components within the pores are compressed and there is a gross flow of the gaseous components surrounding the solids into the pores. The gross flow into the pores occurs much more rapidly than mere diffusion, thus permitting the sorbable material to reach the sorption sites at a faster rate. As the pressure decreases during the oscillation, there is a gross or positive flow of gaseous material out of the pores. It will be appreciated that the adsorbed components remain in the pores.

BRIEF DESCRIPTIONS OF THE DRAWINGS

FIG. 1 is an apparatus designed to carry out the process of this invention.

FIG. 2 is another apparatus designed to carry out the process of this invention.

FIG. 3 is a cross section of a pore exit to a gas phase with conditions of flow producing a laminar film.

FIG. 4 is a cross section of a pore exit to a gas phase with conditions of internal oscillation which will disrupt a laminar film.

FIG. 5 is a greatly enlarged view of two intersecting capillaries within a porous particle of a bed when pressure is normal.

FIG. 6 is a greatly enlarged view of two intersecting capillaries within a porous bed when pressure is increased.

FIG. 7 is a greatly enlarged view of two intersecting capillaries within a porous bed when pressure is decreased.

DETAILED DESCRIPTION

Figure 8:
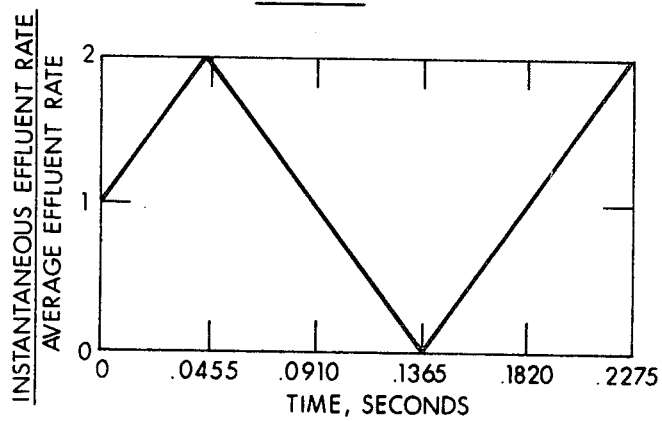
FIG. 8 is a graph representing the instantaneous effluent rate divided by the average effluent rate at a given time.

Basically, the invention comprises introducing a gaseous phase into a porous zone containing at least two components in the gaseous phase and creating a cyclic flow into the pores of the porous zone by oscillating the pressure rapidly over the zone.

In general, the pressure oscillation may be at a frequency of 0.01 cycle per second to 5,000 cycles per second. Pressure oscillations above these ranges are not needed and are not practical for gas-solid systems on a commercial scale. It is preferred that the pressure oscillation be at a rate of 0.1 to 500 cycles per second, most preferably at a rate of 0.25 to 25 cycles per second. The pressure amplitude of the oscillation may vary between 0.0001 p.s.i. to 200 p.s.i., preferably 0.001 p.s.i. to 20 p.s.i. and most preferably 0.01 p.s.i. to 2 p.s.i.

The pores within the porous zone may be between 3 and $10^6$ A. in diameter, preferably between 5 and $10^4$ A. in diameter.

This process will have particular application in the field of molecular sieves. In U.S. Pat. No. 2,899,379 it is disclosed that zeolites, either natural or synthetic, have certain crystal patterns which form structures containing a large number of small cavities interconnected by a number of still smaller holes or pores, the latter being of an exceptional uniformity of size. These zeolites are commonly referred to as molecular sieves. They have been described in detail in other publications such as U.S. Pat. Nos. 3,070,542; 2,422,191 and 2,306,610, all of which are herewith incorporated by reference, an article entitled "Molecular Sieve Action of Solids" appearing in Quarterly Reviews, vol. 3, pp. 293–330 (1949), published by the Chemical Society (London) and in a book entitled Molecular Sieves by Charles K. Hersh and published by the Reinhold Publishing Corporation (1961).

To illustrate the applicability of this invention, reference is made to U.S. Pat. No. 2,899,379. In U.S. Pat. No. 2,899,379 there is disclosed a process for separating branched chain or aromatic hydrocarbons from normal paraffin hydrocarbons. It is disclosed in this patent that normal paraffins would selectively adsorb on molecular sieves and could be subsequently desorbed by treatment with a displacing agent such as ammonia at temperatures of about 70° to about 600° F., but preferably below 400° F. The ammonia itself was recovered by heating to 600° to 800° F.

In a normal paraffin separation process such as outlined in U.S. Pat. No. 3,070,542 where normal hydrocarbons are absorbed in an adsorption step on a zeolitic sieve bed and then desorbed in a desorption step from the sieve bed by a displacing agent such as for example $NH_3$, the utilization of the molecular sieve bed is frequently a problem. A more complete utilization of the total volume of the bed can be obtained by utilizing the internal oscillation technique of the invention during the adsorption. In a normal paraffin separation process, the bed is more completely loaded with normal paraffins when higher molecular weight feeds are used starting at about $C_{10}$. Completeness of removal of normal paraffins can be a problem. That is, some normal paraffins particularly above $C_{22}$, e.g. $C_{24}$ through $C_{40}$ carbon number, can be a problem in that they are not completely removed when they are passed through the bed. Consequently, some normal paraffins come out with the effluent from the bed. This problem can be greatly reduced by the use of the internal oscillation technique during adsorption. Thus, two benefits are realized during adsorption utilizing the internal oscillation technique. The sieve is more completely utilized for normal paraffins, that is, the loading of normal paraffins is higher. Secondly, the normal paraffins coming out the effluent end of the bed are minimized in cases where the feeds contain carbon numbers of $C_{22}$ or higher. In the desorption step in the normal paraffin separation process, it is desirable to use a minimum amount of ammonia. The use of the internal oscillation technique allows one to come closer to the equilibrium of the system thereby having to pass less ammonia over the system for any given percentage of desorption. Thus, for a process operating at a set percentage of desorption, the amount of ammonia required per cycle is substantially reduced. With respect to the oscillations themselves, in the adsorption state for normal paraffin separation, a frequency of 1.5 to 30 cycles per second would be satisfactory. The amplitude of these oscillations could vary between 0.005 and 0.2 p.s.i. With respect to desorption in normal paraffin separation, a cycle time of 0.01 to 10 cycles per second would be satisfactory. One-tenth to one cycle per second would be preferred. The amplitude of the oscillation on desorption could vary between plus or minus 2 p.s.i. to 0.02 p.s.i. A preferred range would be 0.1 p.s.i. to 2 p.s.i.

The displacing agent is defined as a polar or polarizable material having an appreciable affinity for the zeolitic adsorbent compared with the material desired to be desorbed. The displacing agent must have dimensions small to penetrate the adsorbent. The displacing agent will generally have a heat of desorption approximately equal to the material it is desired to desorb. Displacing agents are also referred to as desorbents, displacing mediums and desorbing mediums. Suitable displacing agents for the process of this invention include $SO_2$, ammonia, carbon dioxide, $C_1$–$C_5$ alcohols such as methanol and propanol; glycols such as ethylene glycol and propylene glycol; halogenated compounds such as methyl chloride, ethyl chloride, methyl fluoride, nitrated compounds such as nitromethane and the like. Preferably, the displacing agents are used in a gaseous state. A preferred displacing agent has the general formula

wherein $R_1$, $R_2$ and $R_3$ are selected from the group consisting of hydrogen and $C_1$–$C_5$ alkyl radicals. Thus, the desorbing material includes ammonia and the $C_1$–$C_5$ alkyl radicals. Thus, the desorbing material includes ammonia and the $C_1$–$C_{15}$ primary, secondary and tertiary amines with ammonia being preferred and the $C_1$–$C_5$ primary amines being next in order of preference. Examples of preferred primary amines include ethyl amine, methyl amine, butyl amine and the like.

A desorption agent can be either a displacing agent or a purging agent. A purging agent desorbs by a reduction of partial pressure. Examples of catalytic systems where the instant invention could be utilized include hydroforming, hydrotreating, nickel hydrogenation, catalytic cracking hydrocracking, $NH_3$ synthesis, hydrodenitrogenation and iron ore reduction. Any porous zone may be utilized. Among them are the diatomaceous earths such as kieselguhr and montmorillonite. Other examples include silica-alumina, bauxite, chromia-alumina and alumina. A variety of other porous materials are well known to those skilled in the art. Other examples of porous materials are defined in U.S. Pat. Nos. 2,882,243 and 2,882,244 which are herein incorporated by reference.

Three techniques are proposed for the oscillating arrangement of this invention. The first of these techniques would involve a constant rate of input of gas into a zone containing a porous bed and a cyclic restriction on the output so that the output may be varied while the input remains constant. A second method would be a cyclic input rate with a constant restriction on the output. Thus, the input flow (or gas entrance velocity) would be varied and the output of gas from the zone containing the porous bed would be constant. In this manner, the amount of gas in the zone of the bed would follow a cyclic arrangement, increasing when the cyclic rate is increased and decreasing when the rate is decreased. Another suggested method for this invention would be the use of a constant input rate and a constant restriction on the outlet with an oscillating volume source being connected to the zone of the bed. These methods will be subsequently discussed in greater detail, with reference to the drawings. Combinations of the foregoing methods may also be used.

Turning first to FIG. 1, the reference numeral 1 refers to a bed of packed porous particles such as, for example, molecular sieves. A great variety of other packed porous particles may be utilized and prominent among them are the followings: 5A sieves, 10X and 13X sieves, alumina, silica gel, charcoal and others which would be obvious to one skilled in the art. The reference numeral 2 refers to an input line through which gaseous material enters the bed of packed porous particles 1. The reference numeral 3 refers to an outlet line. Gaseous material which has contacted the bed of packed porous particles 1 pass out from the system through line 3. With respect to the three techniques of this invention in order to cause gross flow of gaseous material into and out of the porous particles of bed 1, the following techniques are utilized: (1) a constant input rate of gas through line 2. The gas passes through sieve bed 1 and oscillating restriction 4 is placed over outlet line 3. In this manner the restriction 4 by blocking line 3 results in greater pressure developing within the bed 1 and the subsequent forcing of gaseous material into the porous particles. The oscillating period utilized for the restriction 4 generally falls in the range of from 100 to 0.005 second. (2) The second method to be utilized in accordance with this invention involves the use of an oscillating restriction 5, across line 2. By means of oscillating restriction 5, the input of gas to porous bed 1 may be controlled. At the same time oscillating restriction 4 is withdrawn and gas is allowed to flow constantly through line 3. Thus, there is a cyclic input and a constant output which will result in a buildup of pressure within the sieve bed 1. (3) As a third method for forcing gaseous material into and out of the porous particles of the sieve bed, a constant gas input rate and a constant output rate vary the volume of a zone connected to the bed and, consequently, vary the pressure in the bed 1 since the amount of gas which may be removed remains constant.

The third method may be more clearly seen by turning to FIG. 2. In FIG. 2 gaseous material enters porous bed 15 through line 16 and leaves through line 17. Neither line 16 nor line 17 contain an oscillating restriction. The pressure within the bed is varied by means of cylinder 18 and piston 19. Cylinder 18 connects with bed 15 through conduit 20. When piston 19 moves upwardly in cylinder 18, the increased pressure is transmitted through conduit 20 into bed 15. In opposite fashion, as piston 19 moves down in cylinder 18, the pressure in bed 15 is reduced.

The system of this invention can be of the nominal batch type, that is, either continuous input or output could be eliminated. Some liquid can be present as long as all of the external surface area of the particles is not covered by a liquid film.

Techniques of this invention cause gross flow into and out of the porous particles through the pores. The effects of this invention may be best understood by reference to conventional mass transfer mechanisms. Thus, if we are to follow a component from the bulk phase to the interior of a particle, advantages which will be manifested by the instant invention will become more apparent. Starting at the most gross level, a component must be transferred from the bulk phase to the laminar film which exists around an individual particle. The mechanism for this transfer is well known and it consists of either molecular or eddy diffusion. The mechanism of pressure oscillation does not have great bearing at this point. However, this process can be made a rapid one with conventional techniques and no change need be made here. The component must then be transferred from the laminar film by molecular diffusion to the surface of a particle itself. Traditionally, this has been solely a molecular diffusion mechanism and has been quite slow in its velocity. With the use of this technique, a laminar film in the classical sense of the concept cannot exist as the material immediately adjacent to the surface at the pore openings, is cyclically being forced into the particle and material from the interior of the particle being forced to the outside surface. This removes a resistance that in many cases in conventional mass transfer is the major resistance. Turning now to FIG. 3, this figure illustrates how the instant invention results in a technique which will disrupt the laminar film. FIG. 3 illustrates the classical situation of molecules, represented by numeral 11, moving past a porous particle 13, which has a laminar layer or film 12, covering the opening to a given pore 14 in the porous particle 13. The particle 13 may be a 5A molecular sieve held in a binder but, of course, it may be any of the known porous particles such as alumina, silica gel or any molecular sieve. The molecules of gas 11 passing over the molecular sieve, for purposes of example, may be ammonia and a long chain normal paraffin. The only molecules of ammonia to pass through the laminar layer 12 would be those which accomplished this process by molecular diffusion. Molecular diffusion is a slow process by its nature.

FIG. 4 illustrates the laminar film being disrupted by the process of the instant invention. Molecules 11 are passed over the surface but because the pressure at which the molecules are passing over the surface is being constantly varied, the laminar film 12 is disrupted by molecules 11 passing through, going into the center of the pore 14 and coming out from pore 14 when the pressure is reduced. The flow of gas molecules is perpendicular to the laminar film and, consequently will disrupt the said film.

Once at the surface of the particle, the component must diffuse into the particle through the capillaries. This, too, traditionally has been a molecular diffusion mechanism. Rather than relying on the slow molecular diffusion mechanism to transfer a component in the capillaries, the instant invention forces an elaborate mixing within the capillaries. This mixing occurs because the capillaries are intersecting and have different diameters. The gross flow back and forth through the network of capillaries provides an excellent mixing. To better understand this concept, a study of FIG. 5 is needed. Turning now to FIG. 5, the same intersecting capillaries are seen at three stages of the internal oscillation cycle. It should be noted that capillary 100 is considerably smaller in diameter than capillary 101. Material in the form of $x$'s is located within capillary 100 and material in the form of $o$'s is located within capillary 101. At the start of the cycle in FIG. 5, it is seen that all of the $x$'s are in the smaller capillary and all of the $o$'s are in the larger capillary and they are all at the same level. In FIG. 6, the pressure over the bed has been increased. The velocity of flow in the larger capillary is far greater than the velocity of flow in the smaller capillary. Thus, if the distances are traced, it is seen that the $o$'s have traveled considerably farther within capillary 101 than have the $x$'s. The $x$'s have transferred to the large capillary and now remain in the large capillary at the point where it intersects the small capillary. In FIG. 6 the pressure has now been decreased over the capillary bed. Once again, the material in the large capillary will move farther than the material in the small capillary. The $o$'s will move back to their original position in the large capillary. The $x$'s will divide because of their location. Some of the $x$ material will be swept into the larger capillary and the remainder of it will pass back into the smaller capillary thus causing an efficient mixing within the capillaries which would not have been present with previous techniques. Some of this material is now shown at a height higher than before the oscillation thus showing mixing in the same direction as the flow.

Once in the immediate vicinity of a sorption site, the sorption must occur. This technique will not have an effect on the sorption once the component has reached the site for adsorption. However, this is not of any great importance because this step is very rapid.

In addition to the numerous above-mentioned beneficial effects on the regions of classical mass transfer, there is an additional, very important effect that has no classical counterpart. This is the forcing of material through interfaces. Material of the compositions adjacent to each side of an interface is forced through the interface resulting in a net transfer of a component through the interface, if there is a resistance adjacent to the interface (i.e. if the compositions on either side are different). This is true with all interfaces both between the porous particles and the gas phase and interfaces within the porous particles. Examples of the latter are interfaces between sieve crystals and the binder holding them are pseudointerfaces in homogeneous solids between regions of different characteristics. Pressure oscillations that are produced with this internal oscillation technique can be mechanically troublesome as equipment must be built to withstand the stresses imposed by the oscillating pressure.

Consequently, it may be desirable to reduce the oscillation amplitudes for a given amplitude of internal oscillation. This can be accomplished by a variety of techniques. These all consist of altering the system so that some of the material that is cyclically accumulated in the zone of the bed is adsorbed on the porous solid rather than staying in the gas phase and contributing to the cyclic pressure increase. If the system is made one such that the partial derivative of loading of a porous solid present with partial pressure of a component present in the gas phase at the partial pressure used, this will decrease the amplitude of the pressure oscillations. The addition of a component to the gas phase that has a substantial derivative of loading with partial pressure to facilitate flow will result in a reduction of the pressure oscillation. A component may also be added to the porous solid to achieve the same effect.

In order to quantitatively define the application and limitations of this technique, it is necessary to express its application in terms of characteristics of the system that can be physically measured.

As the systems with which this technique will show substantial benefits have several characteristics that vary over several orders of magnitude (i.e., degree of porosity, openness of pores, size of particles, amount of material adsorbed in the porous particles, temperature of operation and pressure of operation), the best way to explain the application of the technique and express the limitations of the technique is through equations showing the relation between those characteristics of the system and the oscillation that can be measured.

This technique is applicable only to systems containing porous solids. Equation 1 defines the degree of porosity in terms of the total surface area for nitrogen and the superficial surface area calculated as the area of equivalent spheres.

$$\frac{A_T}{A_S} \geq k_1$$

$A_T$=Total surface area available for adsorption. Defined as the monolayer adsorption surface for $N_2$ as determined by the B.E.T. method (in ft.$^2$).
$A_S$=Superficial surface area. Defined as the surface area of spheres having the same volume as the average particle in (ft.$^2$). (Volume of the average particle is $V - V_v$ divided by the number of particles).
$V$=Volume of the zone containing the bed (in ft.$^3$).
$V_v$=Volume of the voids external to the porous particles in the zone. This volume can be measured by filling these voids with a nonwetting liquid such as mercury at atmospheric pressure (in ft.$^3$).

where $k_1$ must be equal to 100, preferably equal to 5,000 and most preferably, equal to 50,000.

Forcing a cyclic flow in the pores of the particles is required for this technique to be applicable. In order to have this flow, there must be a cyclic accumulation and depletion of material from the zone of the bed. The amplitude of this oscillation (Vac) is defined as the arithmetic sum of material accumulated and depleted from the zone of the bed in one cycle, expressed as a volume. This is quantitatively defined in terms of relative input and effluent rates to and from the zone as shown by the equation below:

$$V_{ac} = \int_t^{t+p} \left| v_e - \frac{v_i}{r} \right| dt$$

Vac=Amplitude of oscillation in the bed. Arithmetic sum of material accumulated and depleted from the zone of the bed in one cycle expressed as a volume (in ft.$^3$).
$t$=Instantaneous time (in sec.)
$p$=Period of oscillation (in sec.)
$v_e = v_{e1}$ which is instantaneous flow out of the zone of the bed of effluent gas and perhaps liquids at the conditions of flow with the gas rate corrected to an equivalent flow at the average pressure at this point (in ft.$^3$/sec.), plus $v_{e2}$ which is instantaneous flow out of the zone of the bed to the oscillating volume at the conditions of flow with the gas rate corrected to an equivalent flow at the average pressure at this point (in ft.$^3$/sec.).
$v_i = v_{i1}$ which is instantaneous flow into the zone of the bed of input gas and perhaps liquids at the condition of flow with the gas rate corrected to an equivalent flow at the average pressure at this point (in ft.$^3$/sec.), plus $v_{i2}$ which is instantaneous flow into the zone of the bed from the oscillating volume connected to the zone of the bed at the conditions of flow with the gas rate corrected to an equivalent flow at the average pressure at this point (in ft.$^3$/sec.)

$$r = \frac{\int_t^{t+p} v_e dt}{\int_t^{t+p} v_i dt}$$

Not all of the material accumulated and depleted goes into and comes from the pores of the particles. This is particularly true if the structure of the pores is not very open so that they provide a large resistance to flow. Correction for the amount of material merely accumulated and depleted from the voids external to the particles can be made by proper consideration of the volume of the voids, the total pressure and the amplitude of the pressure oscillation. The amplitude of the oscillation in the pores of the system ($V_{pen}$), expressed as a volume, is quantitatively defined by the equation below:

$$V_{pen} = \frac{P_T}{P_o} \int_t^{t+p} \left| v_e - \frac{v_i}{r} \right| dt - V_v$$

$V_{pen}$=Amplitude of oscillation in pores of particles. Arithmetic sum of material accumulated and depleted from the pores of the particles in one cycle expressed as a volume (in ft.$^3$).
$P_T$=Total pressure of operation (in p.s.i.a.)
$P_o$=Oscillation of pressure from minimum to maximum (in p.s.i.a.)

This technique is dependent upon mixing occurring as the material moves in the pores of the porous solid. There is a minimum distance or amplitude of movement below which the technique will not have substantial effect. This minimum amplitude must be substantial in comparison to the dimensions of the pores and distances between pore intersections. This cyclic amplitude of movement, a distance, can be calculated for material in the pores adjacent to the surface of the particles by dividing the $V_{pen}$ by the superficial surface area of the particles and correcting for the portion of the particles that are pores.

Equation 4 defines this minimum distance in terms of the total pressure of the system, the amplitude of the pressure oscillation, the period of oscillation, the relative flows in and out of the bed, the volume of the voids, and the superficial surface area of the particles.

Equation 4

$$k_2 = \left[\frac{V - V_v}{V_p A_s}\right] \left[\frac{P_T}{P_o} \int_t^{t+p} \left| v_e - \frac{V_i}{r} \right| dt - V_v \right]$$

$k_2$=Distance of oscillation in pores adjacent to the surface.
$V_p$=Volume of the pores with the porous particles in the zone. This may be measured by the complete filling of an exhaustively "degassed" and dried bed with compound in the liquid state such as $N_2$ of $H_2O$ that completely penetrates the pores. $V_v$ is subtracted from the volume available to this liquid to obtain $V_p$, where $k_2$, the distance of oscillation, must be equal to or greater than $1.5 \times 10^{-6}$ ft., should preferably be equal to or greater than $3.0 \times 10^{-5}$ ft. and, most preferably, equal to or greater than $1.0 \times 10^{-3}$ ft.

There is a maximum amplitude of flow within the particles beyond which there is no practical reason to exceed. This maximum amplitude is expressed as a factor times the volume of the pores. This is expressed by Equation 5 which is similar to Equation 4 with the exception that the volume of the pores is included in this equation rather than a superficial surface area.

Equation 5

$$k_3 = \frac{V_{pen}}{V_p} = \left[\frac{1}{V_p}\right]\left[\frac{P_T}{P_o}\int_t^{t+p}\left|v_e - \frac{v_i}{r}\right|dt - V_v\right]$$

$k_3$=The factor times volume of the pores expressing the flow, where $k_3$ must be equal to or less than 50, preferably, equal to or less than 2 and most preferably, equal to or less than 0.1.

In some applications, it is desirable to minimize the amount of feed composition material in the effluent from the zone. This would be the case, for instance, in the removal of normal paraffins from a middle distillate hydrocarbon fraction to minimize the pour point of the effluent. This would also be true in catalytic systems where the equilibrium conversion is sufficiently complete for direct sales. A potential problem exists with the use of this technique in allowing feed material to come out in the effluent from the zone. This occurs at large flow amplitudes because, if the volume of flow coming out of the pores is equivalent or greater than the void volume of the bed, the feed that goes in during the outflow phase of the cycle must come out in the effluent from the zone. To avoid this problem, the maximum amplitude of cyclic flow ($V_{pen}$) must be further limited to a fraction of the void volume of the bed. Equation 6 expresses the fraction of void volume swept in our oscillation.

Equation 6

$$k_4 = \frac{V_{pen}}{V_v} = \left[\frac{1}{V_v}\right]\left[\frac{P_T}{P_o}\int_t^{t+p}\left|v_e - \frac{v_i}{r}\right|dt - V_v\right]$$

$k_4$=Oscillating flow as a fraction of void volume where $k_4$ must be equal to or less than 0.2, preferably equal to or less than 0.05, and most preferably, equal to or less than 0.002.

When the internal oscillation is caused by cyclically varying the relative flows into and from the zone, there is a maximum frequency that can be used to produce any given amplitude (Vac) which is used. This is because no higher flow rate into or from the porous particles can be achieved than that either going into the zone or coming from the zone. Thus, at the given volume amplitude (Vac) some minimum time is required to accumulate that volume with any given flow rate into the system even if nothing leaves the system. The minimum time corresponds to a maximum frequency. This maximum frequency is expressed in terms of Equation 7.

Equation 7

$$f_{max} = \frac{2\overline{v_e}}{\int_t^{t+p}\left|v_e - \frac{v_i}{r}\right|dt}$$

$f$=Frequency of oscillation (in 1/sec.)

$$\overline{v_e} = \text{Av. } v_e = \int_t^{t+p} v_e dt$$

The minimum effective frequency is expressed in Equation 8.

$$f_{min} \geq k_6 f_{max}$$

where $K_6$ is equal to 0.01 and preferably, equal to 0.05.

In some cases it is desirable to limit the amplitude of pressure oscillations so that the system does not have to be mechanically designed to withstand large pressure fluctuations. In addition some systems have inherent pressure flutuations, such as fluid bed systems, more efficient mass transfer may be obtained in some cases by increasing the amplitude of the oscillation in the pores of the particles ($V_{pen}$) with the naturally occurring pressure fluctuations. Either of these can be accomplished by changing the system by adding a component to either or both the gas or porous solid phase, such that the new system will have a substantial partial derivative of loading of material present with pressure at the partial pressure used. The partial derivative is substantial when Equation 9 is satisfied.

$$\frac{\partial V_c}{\partial P_c} \geq \frac{0.1yc}{P_{ow}}\left[\frac{P_T}{P_{ow}}\int_t^{t+p}\left|v_e - \frac{v_i}{r}\right|dt - V_v\right]$$

$V_c$=Amount of component $c$ adsorbed in the zone of the bed expressed as an equivalent gas phase volume at $P_T$.
$P_c$=Partial pressure of component $c$ (in p.s.i.a.)
$yc$=Mole fraction component $c$ in gas.
$P_{ow}=P_o$, with the same Vac, measured without the addition of a component to either or both the gas or porous solid phases.

Furthermore, the addition to the particles of porous solid of an additional porous solid that has a substantial derivative of loading with partial pressure of one of the components in the feed may also be utilized for the same purpose.

DESCRIPTION OF THE PREFERRED EMBODIMENTS

The following examples are a further illustration of this invention, and a preferred embodiment thereof.

Example 1

In this example, a comparative set of experiments were run, one without and the other with internal oscillation in the adsorption step of a n-paraffin removal process. In both cases the adsorbent used was a 5A molecular sieve held in a clay binder to form extrudates 1/16" in diameter.

The hydrocarbon feedstock was a solvent 100 neutral that had previously been extracted, hydrofined and dewaxed to a 20° F. pour point. A hydrocarbon feed rate, 0.3 weight of feed per weight bed per hour, was used. Ammonia was added to the feed so that there were 7 moles of $NH_3$ for each mole of hydrocarbon feedstock. This combination was passed over the bed which was previously loaded with $NH_3$ at the temperature and pressure of adsorption. The bed was run at 725° F. at a pressure of 250 mm. Hg absolute pressure.

In the case without internal oscillation, the rates of feed and effluent from the bed were constant. In the case using internal oscillation there was a restriction on the effluent end of the bed oscillating the effluent rate between zero and twice the average effluent rate at a frequency of 5.5 cycles per second.

The effluent rate changed at a positive uniform rate going up the maximum rate and proceeded down to zero with the negative value of the same uniform rate as shown in FIG. 8. The feed input rate was constant in this case using the amplitude of each oscillation which was about 0.02 p.s.i.

Figure 9:
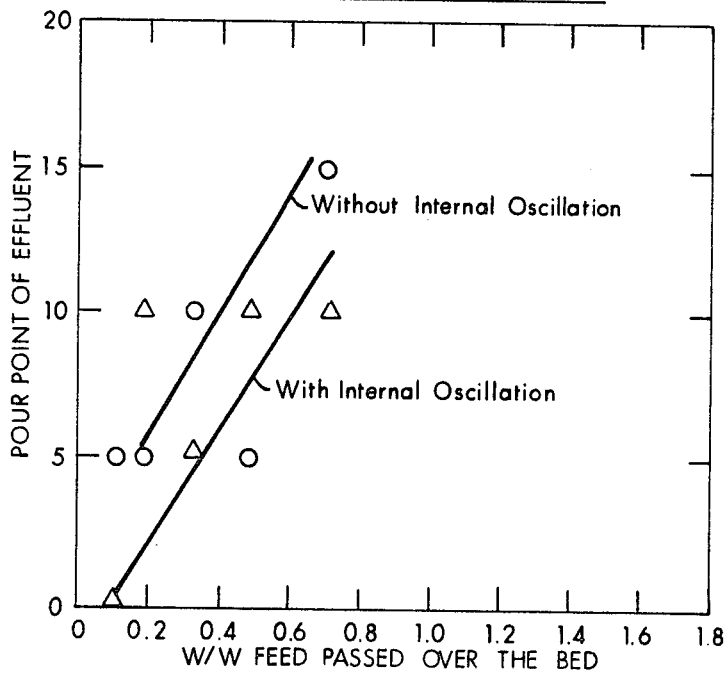
FIG. 9 is a graph comparing n-paraffin adsorption with internal oscillation and without internal oscillation.

FIG. 9 shows that in the case where internal oscillation was utilized, more complete removal of n-paraffins was achieved as the pour points of the effluent were lower than in the case without internal oscillation.

In both of these cases the n-paraffins were then desorbed by passing $NH_3$ over the bed. The aromatics were removed from the first 80% of the hydrocarbons desorbed so that the aromatic free, desorbed hydrocarbon could be analyzed by mass spectra. The results of the mass spectra are shown in Table I.

TABLE I

More n-paraffins and high molecular weight n-paraffins removed

| Percent of compound | With internal oscillation | Without internal oscillation |
|---|---|---|
| $nC_{16}$ | 0.7 | 0.7 |
| $nC_{17}$ | 2.3 | 2.0 |
| $nC_{18}$ | 5.2 | 3.9 |
| $nC_{19}$ | 9.5 | 7.3 |
| $nC_{20}$ | 13.1 | 8.7 |
| $nC_{21}$ | 12.2 | 6.9 |
| $nC_{22}$ | 8.1 | 3.7 |
| $nC_{23}$ | 3.9 | 1.7 |
| $nC_{24}$ | 1.9 | 0.7 |
| $nC_{25}$ | 0.8 | 0.2 |
| $nC_{26}$ | 0.4 | |
| $nC_{27}$ | 0.1 | |
| $nC_{28}$ | 0.2 | |
| $nC_{29}$ | 0.2 | |
| $nC_{30}$ | 0.1 | |
| Total percent n-paraffins | 58.7 | 35.8 |

More effective use of the adsorbent is obtained using internal oscillation as shown by the higher total n-paraffin concentration of 58.7% vs. 35.8% without using this technique. This, of course, shows that a higher adsorbent loading was obtained using this technique. In addition, it was seen that higher molecular weight n-paraffins are removed from the feed using this technique. The highest molecular weight n-paraffin removed without this technique was $C_{25}$ vs. $C_{30}$.

The major advantages of using this technique in the adsorption of n-paraffins on molecular sieves are (1) more complete removal from the feed, (2) higher adsorbent loading, and (3) higher molecular weight n-paraffin removed.

EXAMPLE 2

In this example a comparative set of experiments was once again run, one without and the other with internal oscillation in the desorption step of a n-paraffin removal process. In this desorption step the n-paraffins are displaced with $NH_3$. The adsorbent was the same as used in Example 1. In both cases the adsorbent was loaded with n-paraffins by passing a distillate containing carbon numbers from 15 to 33 over the bed at 0.4 w./w./hr. with 5 moles of $NH_3$ for each mole of hydrocarbon for a period of forty minutes. A total pressure of 1000 mm. Hg absolute and a temperature 725° F. were used. The internal oscillation technique was not used in either case in this bed loading step. During desorption, internal oscillation was utilized in one of the two cases.

Figure 10:
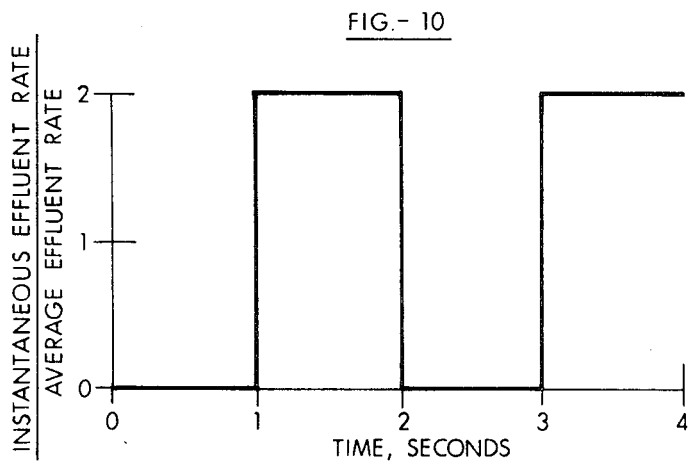
FIG. 10 is a graph representing the instantaneous effluent rate divided by the average effluent rate at a given time.

In both cases $NH_3$ was passed into the bed at a 0.89 w./w./hr. rate at a pressure of 30 p.s.i.a. The temperature was 725° F. In the case without internal oscillation there was an essentially constant restriction at the outlet of the bed. In the case using internal oscillation, the outlet restriction oscillated between the full closed and the full open position with 0.5 cycle per second frequency. This caused the effluent flow to vary as shown in FIG. 10. In the case using internal oscillation, pressure oscillations of ±0.5 p.s.i. were observed in the bed.

Figure 11:
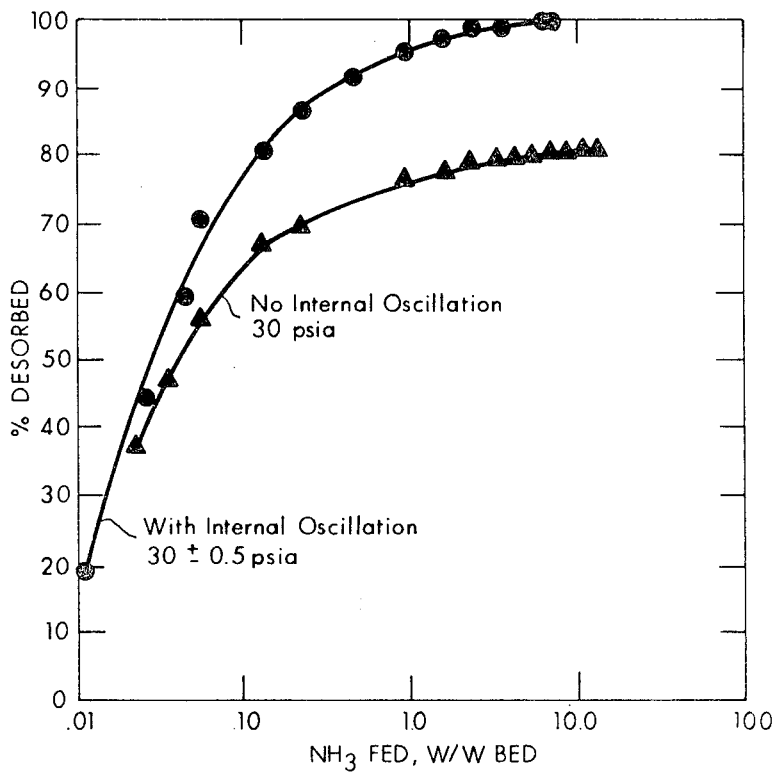
FIG. 11 is a graph comparing the $NH_3$ required for desorption when internal oscillation is utilized with the $NH_3$ required for desorption when there is no internal oscillation.

The n-paraffins were removed from the bed much more rapidly in the case using internal oscillation as can be seen referring to FIG. 11. When 1.0 w./w. had been fed to the bed only 77% of the n-paraffins were removed without this technique but 95% were removed using internal oscillation. This, of course, illustrates the more efficient use of the displacing agent, $NH_3$, when utilizing internal oscillation.

Although this invention has been described with some particularity, it will be understood that variations and modifications can be made therein without departing from the spirit of the invention as hereafter claimed.

What is claimed is:

1. In a process comprising contacting a gaseous phase containing at least two components with a porous molecular sieve material in an adsorption zone during which a portion of at least one component of said gaseous phase is adsorbed onto said molecular sieve, the improvement which comprises oscillating the pressure in said adsorption zone by periodically varying the volume of a conduit connected to said adsorption zone, the amplitude of said oscillation ranging between 0.0001 and 200 p.s.i. and the frequency of said oscillation ranging between 0.01 and 5,000 cycles per second.

2. In a process defined in claim 1, the improvement wherein the pores of said porous sieve are about 3 to $13^{-6}$ A. in diameter.

3. The process of claim 1 wherein the pressure oscillation frequency ranges between 0.25 and 25 cycles per second and the pressure oscillation amplitude ranges between 0.01 and 2 p.s.i.

4. In a process comprising contacting a gaseous phase containing at least two components with a porous molecular sieve material in an adsorption zone during which a portion of at least one component of said gaseous phase is adsorbed onto said molecular sieve, the improvement which comprises oscillating the pressure in said adsorption zone by periodically altering the flow rate of the gaseous phase introduced into said zone, the oscillation amplitude ranging between 0.0001 and 200 p.s.i. and oscillation frequency ranging between 0.01 and 5,000 cycles per second.

5. The process of claim 4 wherein the pressure oscillation frequency ranges between 0.25 and 25 cycles per second and the pressure oscillation amplitude ranges between 0.01 and 2 p.s.i.

6. In a process comprising contacting a gaseous phase containing at least two components with a porous molecular sieve material in an adsorption zone during which a portion of at least one component of said gaseous phase is adsorbed onto said molecular sieve, the improvement which comprises oscillating the pressure in said adsorption zone by periodically restricting the gas phase flowing out of said zone, the oscillation amplitude ranging between 0.0001 and 200 p.s.i. and the oscillation frequency ranging between 0.01 and 5,000 cycles per second.

7. The process of claim 6 wherein the pressure oscillation frequency ranges between 0.25 and 25 cycles per second and the pressure oscillation amplitude ranges between 0.01 and 2 p.s.i.

8. In a separation process comprising contacting a gaseous phase containing at least two components with a porous molecular sieve material in an adsorption zone during which a portion of at least one component of said gaseous phase is adsorbed onto said molecular sieve and wherein the adsorbed gaseous component is desorbed from said sieve through contact with a polar desorption agent, the improvement which comprises oscillating the pressure in said zone during the adsorption and desorption steps by periodically varying the volume of a conduit connected to said adsorption zone, the amplitude of said oscillations ranging between 0.0001 and 200 p.s.i. and the frequency of said oscillations ranging between 0.01 and 5,000 cycles per second.

9. The process of claim 8 wherein the pressure oscillation amplitude ranges between 0.01 and 2 p.s.i. and the pressure oscillation frequency ranges between 0.25 and 25 cycles per second.

10. In a separation process comprising contacting a gaseous phase containing at least two components with a porous molecular sieve material in an adsorption zone during which a portion of at least one component of said gaseous phase is adsorbed onto said molecular sieve and wherein the adsorbed gaseous component is desorbed from said sieve through contact with a polar desorption agent, the improvement which comprises oscillating the pressure in said zone during the adsorption and desorption steps by periodically altering the flow rate of the gaseous phase introduced into said zone, the oscillation amplitude ranging between 0.0001 and 200 p.s.i. and oscillation frequency ranging between 0.01 and 5,000 cycles per second.

11. The process of claim 10 wherein the pressure oscillation amplitude ranges between 0.01 and 2 p.s.i. and the pressure oscillation frequency ranges between 0.25 and 25 cycles per second.

12. In a separation process comprising contacting a gaseous phase containing at least two components with a porous molecular sieve material in an adsorption zone during which a portion of at least one component of said gaseous phase is adsorbed onto said molecular sieve and wherein the adsorbed gaseous component is desorbed from said sieve through contact with a polar desorption agent, the improvement which comprises oscillating the pressure in said zone during the adsorption and desorption steps by periodically restricting the gaseous phase flowing out of said zone, the oscillation amplitude ranging between 0.0001 and 200 p.s.i., and the oscillation frequency ranging between 0.01 and 5,000 cycles per second.

13. The process of claim 12 wherein the pressure oscillation amplitude ranges between 0.01 and 2 p.s.i. and the pressure oscillation frequency ranges between 0.25 and 25 cycles per second.

14. In a normal hydrocarbon separation process wherein a normal hydrocarbon feed containing ammonia premixed with it is passed in the gas phase over a porous zeolitic molecular sieve material in an adsorption zone during which a portion of said normal hydrocarbon is adsorbed onto said molecular sieve and wherein the adsorbed gaseous component is desorbed from said sieve through contact with a polar desorption agent, the improvement which comprises oscillating the pressure in the adsorption and desorption steps by periodically altering the flow rate of the gaseous phase introduced into said zone such that the pressure oscillation frequency ranges between 0.1 and 500 cycles per second and the pressure oscillation amplitude ranges between 0.001 and 20 p.s.i.

15. In a normal hydrocarbon separation process wherein a normal hydrocarbon feed containing ammonia premixed with it is passed in the gas phase over a porous zeolitic molecular sieve material in an adsorption zone during which a portion of said normal hydrocarbon is adsorbed onto said molecular sieve and wherein the adsorbed gaseous component is desorbed from said sieve through contact with a polar desorption agent, the improvement which comprises oscillating the pressure in the adsorption and desorption steps by periodically restricting the flow of the gaseous phase into said zone such that the pressure oscillation frequency ranges between 0.1 and 500 cyces per second and the pressure oscillation amplitude ranges between 0.001 and 20 p.s.i.

16. In a normal hydrocarbon separation process wherein a normal hydrocarbon feed containing ammonia premixed with it is passed in the gase phase over a porous zeolitic molecular sieve material in an adsorption zone during which a portion of said normal hydrocarbon is adsorbed onto said molecular sieve and wherein the adsorbed gaseous component is desorbed from said sieve through contact with a polar desorption agent, the improvement which comprises oscillating the pressure in said zone by periodically varying the volume of a conduit connected to said adsorption-desorption zone, such that the pressure oscillation frequency ranges between 0.1 and 500 cycles per second and the pressure oscillation amplitude ranges between 0.001 and 20 p.s.i.

17. The process of claim 16 wherein said normal paraffins are in the range of $C_{24}$–$C_{40}$.

18. In a normal hydrocarbon separation process wherein a normal hydrocarbon feed containing ammonia premixed with it is passed in the gase phase over a porous zeolitic molecular sieve material in an adsorption zone during which a portion of said normal hydrocarbon is adsorbed onto said molecular sieve and wherein the adsorbed gaseous component is desorbed from said sieve through contact with a polar desorption agent, the improvement which comprises oscillating the pressure in said zone by periodically altering the flow rate of the gaseous phase introduced into said zone and flowing out of said zone, such that the pressure oscillation frequency ranges between 0.1 and 500 cycles per second and the pressure oscillation amplitude ranges between 0.001 and 20 p.s.i.

References Cited
UNITED STATES PATENTS

| | | | |
|---|---|---|---|
| 1,894,257 | 1/1933 | Pier et al. | 208—113 |
| 2,916,444 | 12/1959 | Vernon | 260—680 |
| 3,121,757 | 2/1964 | Faust | 260—676 |
| 3,223,747 | 12/1965 | Bohrer | 260—674 |
| 3,243,472 | 3/1966 | Dinwiddie | 260—680 |

DELBERT E. GANTZ, Primary Examiner

C. E. SPRESSER, JR., Assistant Examiner

U.S. Cl. X.R.

55—75; 208—310; 260—676 MS